United States Patent
Meier et al.

(10) Patent No.: US 8,761,008 B2
(45) Date of Patent: Jun. 24, 2014

(54) SYSTEM, APPARATUS, AND METHOD FOR COMMUNICATION IN A TACTICAL NETWORK

(75) Inventors: John L. Meier, St. Charles, MO (US); Arun Ayyagari, Seattle, WA (US); Brian James Smith, Seattle, WA (US); Fernando Afonso Zamith, St. Louis, MO (US); Carl Joseph Hanks, St. Louis, MO (US); Ronald J. Howard, Chesterfield, MO (US); Christopher K. Zuver, St. Peters, MO (US); Michael R. Gray, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 901 days.

(21) Appl. No.: 12/608,809

(22) Filed: Oct. 29, 2009

(65) Prior Publication Data
US 2011/0103393 A1   May 5, 2011

(51) Int. Cl.
| | |
|---|---|
| G06F 9/455 | (2006.01) |
| G01R 31/08 | (2006.01) |
| G06F 11/00 | (2006.01) |
| G08C 15/00 | (2006.01) |
| H04J 3/14 | (2006.01) |
| H04L 1/00 | (2006.01) |
| H04J 1/16 | (2006.01) |
| H04L 12/26 | (2006.01) |
| H04L 12/28 | (2006.01) |
| H04L 29/08 | (2006.01) |
| H04W 28/08 | (2009.01) |

(52) U.S. Cl.
CPC ........ *H04L 67/1004* (2013.01); *H04L 67/1008* (2013.01); *H04L 67/1014* (2013.01); *H04W 28/08* (2013.01)

USPC .......................................... 370/229; 718/105
(58) Field of Classification Search
None
See application file for complete search history.

(56) References Cited

U.S. PATENT DOCUMENTS

| 5,951,694 A | 9/1999 | Choquier et al. |
| 6,018,659 A | 1/2000 | Ayyagari et al. |

(Continued)

FOREIGN PATENT DOCUMENTS

WO   2010114659 A1   10/2010

OTHER PUBLICATIONS

A. Durresi, M. Durresi, L. Barolli, Heterogeneous Multi Domain Network Architecture for Military Communications, Proceedings of the 2009 International Conference on Complex, Intelligent and Software Intensive Systems, Mar. 19, 2009, pp. 382-387.*

(Continued)

*Primary Examiner* — John Blanton
*Assistant Examiner* — Christopher Crutchfield
(74) *Attorney, Agent, or Firm* — Armstrong Teasdale, LLP

(57) ABSTRACT

A system, apparatus, and method are described for communication in a tactical network. A gateway is communicatively couplable to one or more tactical nodes and to one or more other gateways. The gateway is programmed to transmit information to and/or receive information from other gateways. Information exchanged includes gateway attributes, link attributes, service availability, and/or data availability. The gateway optionally provides quality of service, distributed persistence, load balancing, and/or transformation services. Services are provided in a modular, service-oriented architecture (SOA) to accommodate the addition of services and/or applications.

5 Claims, 7 Drawing Sheets

(56) References Cited

U.S. PATENT DOCUMENTS

| | | | |
|---|---|---|---|
| 7,020,701 | B1 | 3/2006 | Gelvin et al. |
| 7,088,687 | B2 | 8/2006 | Ayyagari et al. |
| 7,155,515 | B1* | 12/2006 | Brown et al. ............... 709/226 |
| 7,519,009 | B2 | 4/2009 | Fleischman |
| 7,561,521 | B2 | 7/2009 | Meier et al. |
| 2002/0152305 | A1* | 10/2002 | Jackson et al. ............... 709/224 |
| 2003/0187978 | A1 | 10/2003 | Nakamura et al. |
| 2004/0142658 | A1 | 7/2004 | McKenna et al. |
| 2005/0228884 | A1* | 10/2005 | Hawley ..................... 709/225 |
| 2006/0209828 | A1 | 9/2006 | Ng et al. |
| 2009/0037925 | A1* | 2/2009 | Jacobs et al. ............... 718/105 |
| 2009/0103729 | A1 | 4/2009 | Mirhakkak et al. |
| 2009/0274045 | A1 | 11/2009 | Meier et al. |
| 2010/0325626 | A1* | 12/2010 | Greschler et al. ............ 717/176 |
| 2012/0087240 | A1* | 4/2012 | Karunakaran et al. ........ 370/230 |

OTHER PUBLICATIONS

E. Di Nitto, D. Dubois, R. Mirandola, Self-Aggregation Algorithms for Autonomic Systems, Presentation at PhDay 2008, Jun. 26, 2008, pp. 1-10.*

Invitation to Pay Additional Fees and, Where Applicable, Protest Fee (with Annex to Form PCT/ISA/206 Communication Relating to the Results of the partial International Search) of PCT/US2010/051420; May 23, 2011; 7 pages.

Small, S., et al.; Scalable VPNs for the Global. Information Grid; Military Communicating Conference, 2005; pp. 1-7.

International Search Report and Written Opinion of PCT/2010/051420; Jul. 14, 2011; 15 pages.

John Meier et al., Intelligent Avionics with Advanced Clustering, Aerospace Conference, 2008 IEEE, Mar. 1, 2008, pp. 1-12, US.

John Meier et al., Intelligent Sensor Fabric Computing on a Chip—A Technology Path for Intelligent Network Computing, Aerospace Conference, 2007 IEEE, Mar. 3, 2007, pp. 1-7, US.

Todd Sproull et al., Management and Service Discovery in Satellite and Avionic Networks, Aerospace Conference, 2007 IEEE, Mar. 3, 2007, pp. 1-13, US.

John Meier et al., Intelligent and Reconfigurable Edge of the Network Computing-Reaping the Benefits of Moving Applications to the Network, MAPLD, Sep. 2006, 17 pages, US.

Gregory Hackman et al., Agile Cargo Tracking Using Mobile Agents, 3rd International Conference on Embedded Networked Sensor Systems, San Diego, CA, Nov. 2, 2005, p. 303, US.

Todd Sproull et al., Sensor Fusion and Correlation, 3rd International Conference on Embedded Networked Sensor Systems, San Diego, CA, Nov. 2, 2005, p. 316, US.

John Meier et al., Gigabit COTS Ethernet Switch Evaluation for Avionics, Proceedings of the 27th Annual IEEE Conference on Local Computer Networks (LCN'02), 2002, 2 pages, US.

John Meier et al., Intelligent Distributed Architecture (IDA) for Mobile Sensor Data Fusion, Washington University in St. Louis, MO, 8 pages, US.

Tirumale Ramesh et al., Network Edge Computing—Using, learning and cultivating best practices to meet the challenges of next-generation high performance embedded computing, 2006 HiPC International Conference, 2006, 2 pages, US.

John Meier et al., A Multi-FPGA high performance computing platform for network-centric applications, 2006 International High Performance Computing Conference, 2006, 6 pages, US.

U.S. Appl. No. 12/417,065; Methods and Apparatus for Routing Data to Nodes; filed Apr. 2, 2009.

Extended European Search Report for Application No. 13168506; Jun. 2, 2013; 5 pages.

Extended European Search Report for Application No. 13168514; Jun. 2, 2013; 7 pages.

Albuquerque, M. et al; Global Information Grid (GIG) Edge Network Interface Architecture; Military Communications Conference; IEEE 2007; pp. 1-7.

* cited by examiner

SYSTEM, APPARATUS, AND METHOD FOR COMMUNICATION IN A TACTICAL NETWORK

BACKGROUND

The field of the disclosure relates generally to routing data within a global network and, more specifically, to methods and apparatus for automatically managing network topology, discovering services, and improving performance at local gateways in communication with IP-based and non-IP-based (whether networked or non-networked) nodes.

Gateway solutions are needed to seamlessly interconnect the global information grid (GIG) with current and future purpose-built networks consisting of Internet Protocol (IP) and non-IP waveforms. The GIG provides command and control features and information sharing to deliver classified and unclassified IP services to key operating locations worldwide. This global network is designed with redundant routes between points to ensure connectivity is not disrupted by a failure at single point. Communication is protected from interception and forgery through the use of High Assurance Internet Protocol Encryption (HAIPE) architecture and protocol services. This results in significant network overhead and associated latency but is necessary to make the GIG a robust, highly reliable network.

As implied above, directly connecting tactical devices to the GIG introduces a risk of communication latency between tactical devices in an operating location. Furthermore, directly connecting tactical devices to the GIG is feasible only for IP-enabled nodes and requires manual address and/or routing configuration each time a node connects to a router, disconnects from a router, or moves from one router to another. Even in the absence of significant latency, network bandwidth may constrain application performance at a local node accessing data from a remote node via the GIG. In addition, network nodes often require data processing services but may be poorly suited to perform such services themselves.

BRIEF SUMMARY

In one aspect, a system is provided for communicating with a tactical node. The system includes a first gateway that is communicatively coupled to a tactical node. The first gateway is programmed to store data from the tactical node to create stored tactical node data, transmit a data availability message describing the stored tactical node data, and transmit the stored tactical node data. The system also includes a second gateway that is communicatively coupled to the first gateway. The second gateway is programmed to receive from the first gateway the data availability message. The second gateway is also programmed to, in response to a first data request from a remote device, transmit to the first gateway a second data request for the stored tactical node data based on the received data availability message. The second gateway is further programmed to receive from the first gateway the tactical node data and transmit the tactical node data to the remote device.

In another aspect, a communication gateway is provided. The communication gateway includes a communication interface that is communicatively couplable to a remote gateway and a processor. The processor is programmed to provide a first instance of a service and determine a first gateway attribute for the gateway. The processor is also programmed to receive from the remote gateway, via the communication interface, a service availability message describing a second instance of the service provided by the remote gateway. The processor is further programmed to receive from the remote gateway, via the communication interface, a gateway attribute message including a second gateway attribute of the remote gateway. The processor is also programmed to, in response to an execution request for the service, select an execution target from the gateway and the remote gateway based on the first gateway attribute and the second gateway attribute.

In another aspect, a method for communication in a tactical network is provided. The method includes detecting, by a first gateway, a tactical node, associating, by the first gateway, a global network address and a name with the tactical node, and transmitting the global network address and the name to an address resolution server via a global network communication interface. Tactical node data received from the tactical node is stored in a memory area. A data availability message, including metadata describing the tactical node data, is transmitted to a second gateway via a tactical network communication interface.

In yet another aspect, a gateway for communication in a tactical network is provided. The gateway includes an inter-gateway communication interface that is communicatively couplable to a plurality of remote gateways and a processor. The processor is programmed to transmit, via the inter-gateway communication interface, a first gateway identifier for the gateway and a first gateway attribute for the gateway. The first gateway attribute includes a processing capacity indicator, processing usage indicator, a memory capacity indicator, and/or a memory usage indicator. The processor is also programmed to receive, via the inter-gateway communication interface, a second gateway identifier for a remote gateway and a second gateway attribute. The processor is further programmed to determine a desired primary gateway identifier based on the first gateway attribute and the second gateway attribute and transmit, via the inter-gateway communication interface, the desired primary gateway identifier. The desired primary gateway identifier is equal to the first gateway identifier or the second gateway identifier.

The features, functions, and advantages that have been discussed can be achieved independently in various embodiments of the invention or may be combined in yet other embodiments, further details of which can be seen with reference to the following description and drawings.

DETAILED DESCRIPTION

In various embodiments, a system and a method for communicating in a tactical network via a gateway are described.

One embodiment may include a tactical embedded gateway and is described herein with relation to the Global Information Grid (GIG) as an example for purposes of this disclosure. A tactical embedded gateway may be installed in a fixed location (e.g., an operational facility), tethered to a fixed location (e.g., coupled to a balloon), installed in a manned or unmanned vehicle (e.g., a wheeled unit, tracked unit, floating unit, submersible unit, or flying unit), or portable (e.g., in a backpack), though any configuration consistent with the embodiments described herein is contemplated.

To automatically route data to a tactical node, a gateway may detect the presence of the tactical node and a local identifier for the tactical node and then acquire a global network address for the tactical node. The gateway is configured to determine a name for the tactical node and then associate the name with the global network address in an address resolution service. The gateway configures itself to subsequently receive data using the global network address and transmit the data to the tactical node using the local identifier. The gateway may later determine the tactical node is no longer present, at which time the gateway removes any configuration corresponding to the tactical node, including the gateway's routing configuration (e.g., association of the tactical node with the global address, name, and local identifier) and the name-address association in the address resolution service. The gateway includes software implementing a service-oriented architecture (SOA) to ease the process of installing and upgrading software services. Furthermore, gateways may interact with each other to provide distributed processing, distributed storage, optimized routing, and/or redundancy.

This written description refers to communication using Internet Protocol (IP), Link 16, and serial interfaces. IP includes, but is not limited to, IP version 4 (IPv4) and IP version 6 (IPv6) standards. References to Link 16 are exemplary and should be understood to also include Link 11, Link 22, and/or other non-IP, networked standards. Serial interfaces include, but are not limited to, Recommended Standard (RS)-232, RS-422, RS-423, RS-432, RS-485, Serial Peripheral Interface (SPI), Inter-Integrated Circuit (I2C), System Management Bus (SMBUS), Universal Serial Bus (USB), and/or the Institute of Electrical and Electronics Engineers (IEEE) 1394 interface. The use of other communication standards and/or interfaces is also contemplated.

Figure 1:
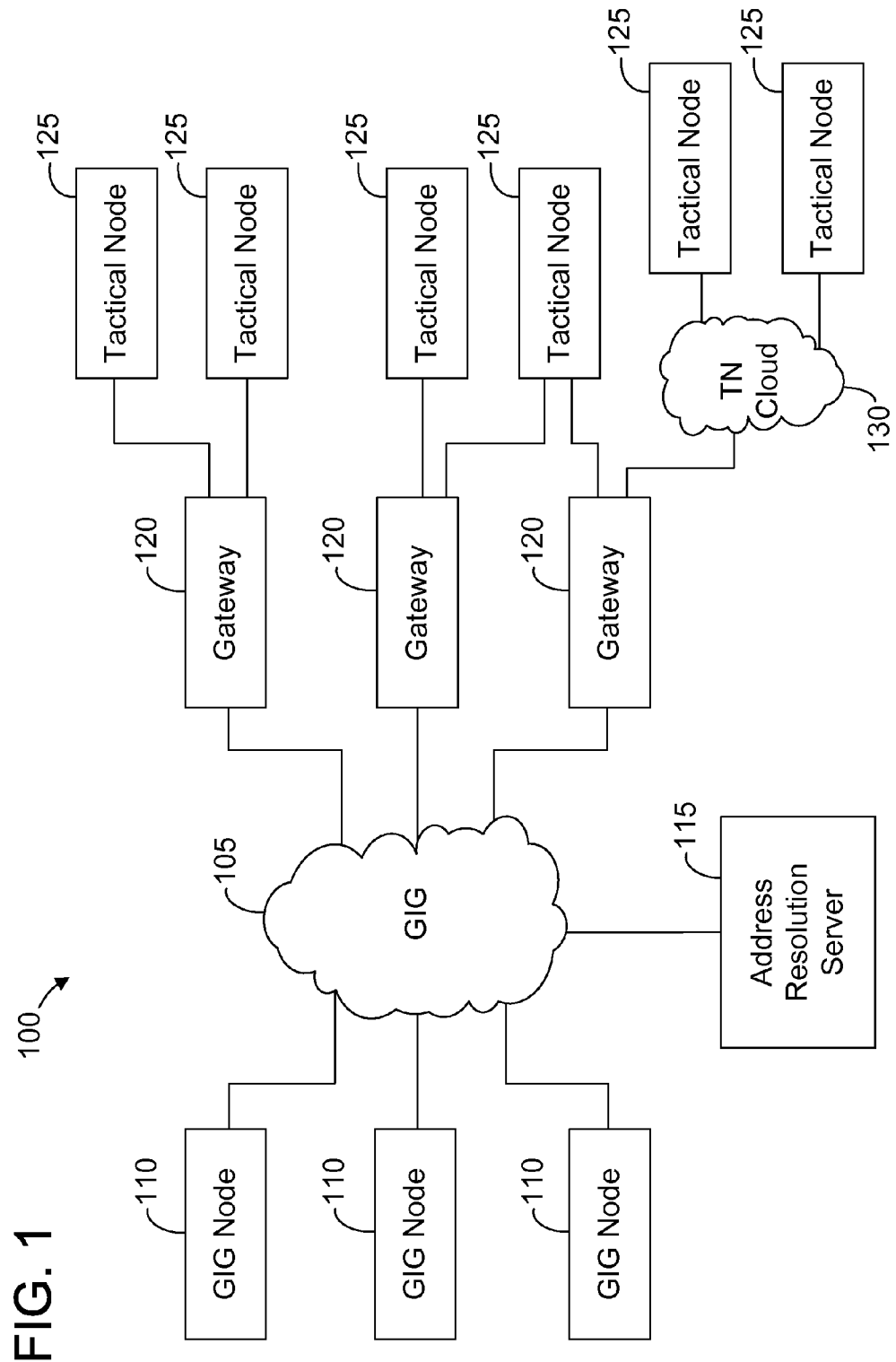
FIG. 1 is a block diagram illustrating a gateway connecting tactical nodes to a Global Information Grid (GIG) in one embodiment of the invention.

FIG. 1 is a block diagram illustrating a network 100 including a Global Information Grid (GIG) 105. Communicatively coupled to GIG 105 are a plurality of GIG nodes 110, an address resolution server 115, and a plurality of gateways 120. GIG nodes 110 may include, but are not limited to, client computing devices and/or server computing devices, described below with regard to FIGS. 2 and 3, respectively. Similarly, address resolution server 115 may be a server computing device. Each gateway 120 is also communicatively coupled to one or more tactical nodes 125. Furthermore, a tactical node 125 may be communicatively coupled to one or more gateways 120, as described in more detail below.

GIG 105 may include the Internet, privately managed hardwired data channels, wireless data channels, and/or satellite-based data channels. For example, GIG 105 may include a wide area network (WAN) or a virtual private network (VPN) created by connecting a plurality of local area networks (LANs) via the Internet and/or other data channels and, optionally, applying encryption to traffic passed between LANs.

Address resolution server 115 maintains a registry of name-to-address associations for tactical nodes 125. For example, address resolution server 115 may include a textual name and an IP address corresponding to a tactical node 125 attached to a gateway 120. Name-to-address associations may be provided by one or more gateways 120, as described below. In an exemplary embodiment, a GIG node 110 or a gateway 120 transmits an address request to address resolution server 115, including a name corresponding to a tactical node 125. Address resolution server 115 receives the address request, identifies an address corresponding to the tactical node 125 based on the name provided, and transmits an address response including the identified address. The GIG node 110 or gateway 120 receives the address response and transmits a message to the tactical node 125 through GIG 105 by addressing the message to the identified address. As described in more detail below, a gateway 120 that is communicatively coupled to the tactical node 125 receives the message and forwards the message to the tactical node 125 corresponding to the address.

In some embodiments, one or more tactical nodes 125 may be coupled to a gateway 120 via a tactical network cloud 130. Tactical network cloud 130 may include, but is not limited to, a LAN, a wireless LAN (WLAN), and/or a mesh network, such as a mobile ad-hoc wireless network (MANET).

Figure 2:
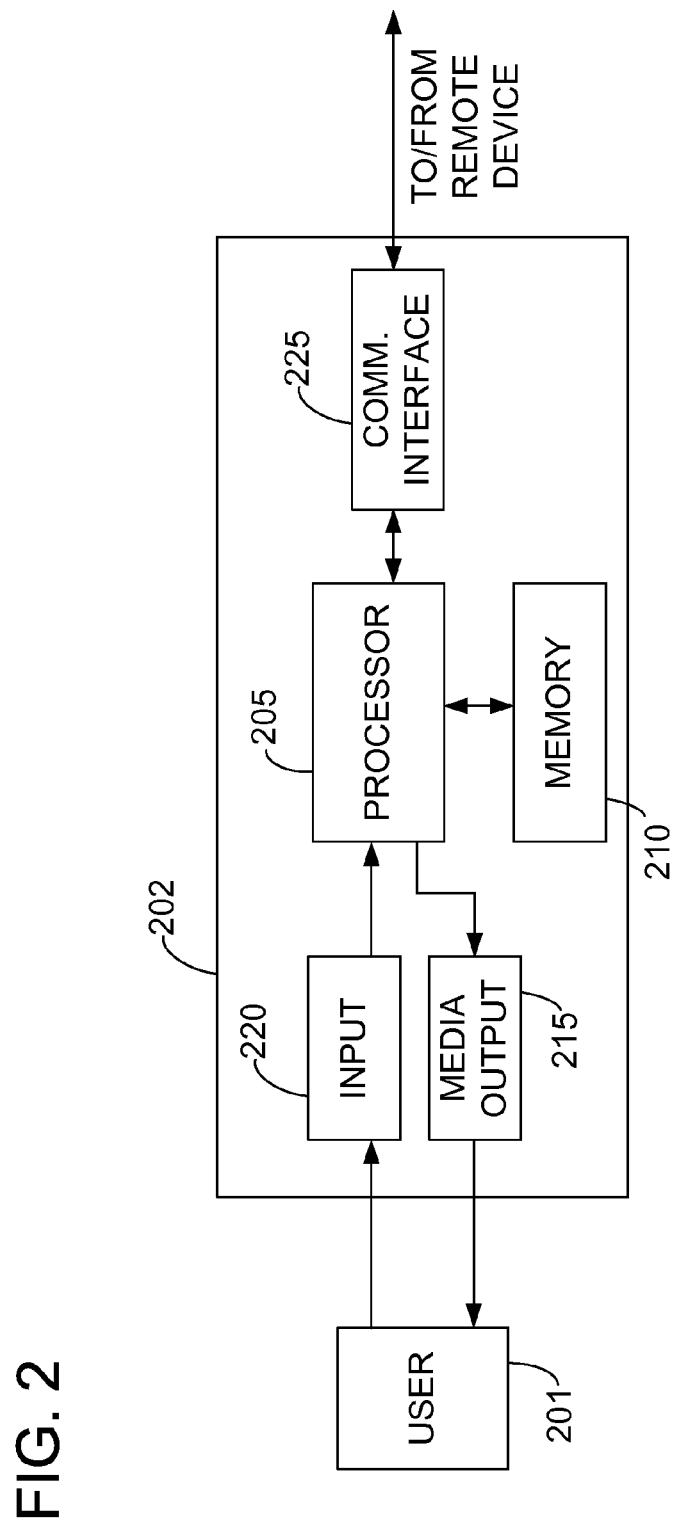
FIG. 2 illustrates an exemplary configuration of a user computing device operated by a user.

FIG. 2 illustrates an exemplary configuration of a user computing device 202 operated by a user 201. User computing device 202 may include, but is not limited to, a GIG node 110 and/or a tactical node 125.

User computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a cathode ray tube (CRT), liquid crystal display (LCD), organic light emitting diode (OLED) display, "electronic ink" display, or printer), an audio output device (e.g., a speaker or headphones), or a Braille device.

In some embodiments, user computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, an audio input device, and/or any other sensor device. A single component such as a touch screen may function as both an output device of media output component 215 and input device 220.

User computing device 202 may also include a communication interface 225, which is communicatively couplable to a remote device such as another GIG node 110, address resolution server 115, and/or a gateway 120. Communication interface 225 may include, for example, a wired or wireless network adapter or a wireless data transceiver for communicating via a mobile phone network (e.g., Global System for Mobile communications (GSM) or 3G), another mobile data network (e.g., Worldwide Interoperability for Microwave Access (WIMAX)), radio frequency (RF), Free Space Optics (FSO), an acoustic communication means, and/or any other suitable means for communicating with a remote device.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website provided by a remote device. A client application allows user 201 to interact with a server application provided by a remote device.

Figure 3:
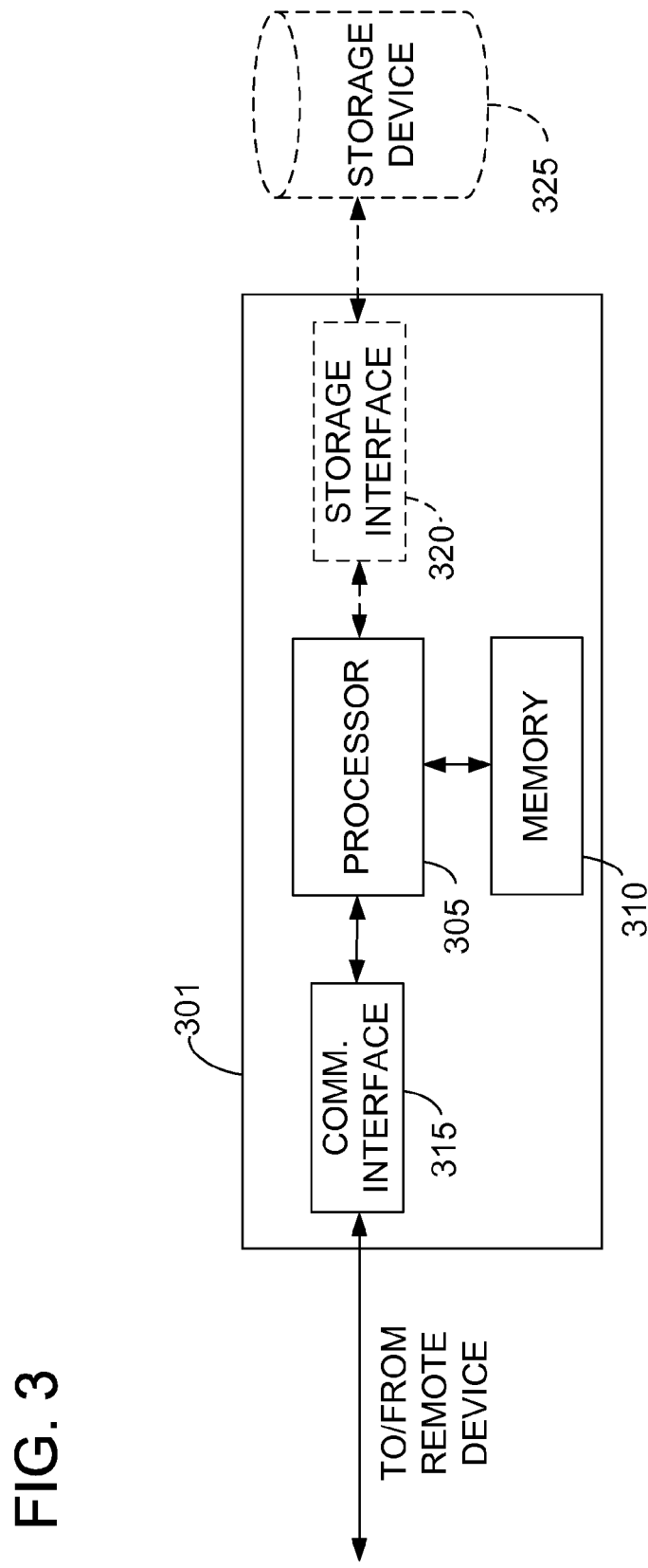
FIG. 3 illustrates an exemplary configuration of a server computing device.

FIG. 3 illustrates an exemplary configuration of a server computing device 301. Server computing device 301 may include, but is not limited to, a GIG node 110 and/or address resolution server 115. A GIG node 110 or address resolution server 115 may include a plurality of server computing devices 301. For example, address resolution server 115 may include a cluster of server computing devices 301 to facilitate improved performance and/or elimination of a single point of failure.

Server computing device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 301 is capable of communicating with a remote device such as a GIG node 110, address resolution server 115, and/or a gateway 120. For example, communication interface 315 may receive requests from a gateway 120 via GIG 105.

Processor 305 may also be operatively coupled to a storage device 325. Storage device 325 is any computer-operated hardware suitable for storing and/or retrieving data. In some embodiments, storage device 325 is integrated in server computing device 301. For example, server computing device 301 may include one or more hard disk drives as storage device 325. In other embodiments, storage device 325 is external to server computing device 301 and may be accessed by one or more server computing devices 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Figure 4:
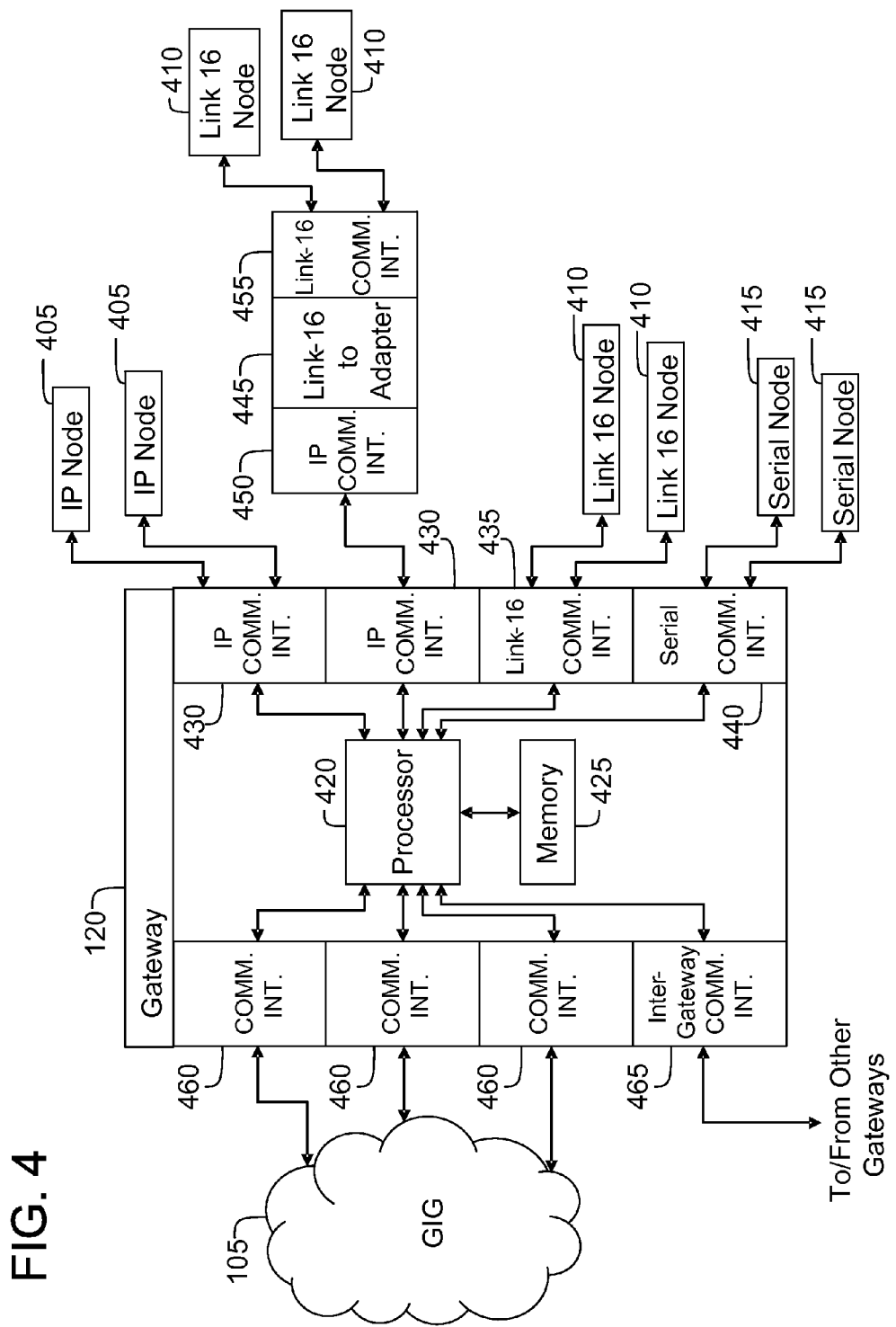
FIG. 4 illustrates an exemplary configuration of the gateway shown in FIG. 1 in communication with a GIG and a plurality of tactical nodes.

FIG. 4 illustrates an exemplary configuration of a gateway 120 in communication with GIG 105 and a plurality of tactical nodes including IP nodes 405, Link 16 nodes 410, and/or serial nodes 415. Gateway 120 includes a processor 420 for executing instructions and a memory area 425. In some embodiments, executable instructions are stored in memory area 425. Processor 420 may include one or more processing units (e.g., in a multi-core configuration). Memory area 425 is any device allowing information such as executable instructions and/or other data to be stored and retrieved. Memory area 425 may include one or more computer readable media and/or storage devices.

Gateway 120 also includes a plurality of tactical node communication interfaces. In an exemplary embodiment, gateway 120 includes IP communication interfaces 430 for communicating with IP nodes 405, Link 16 communication interface 435 for communicating with Link 16 nodes 410, and serial communication interface 440 for communicating with one or more serial nodes 415. Communication interfaces 430, 435, and 440 may include any device suitable for wired and/or wireless communication.

A single tactical node communication interface 430, 435, or 440 may be communicatively coupled to multiple tactical nodes 405, 410, or 415. For example, an IP communication interface 430 may be connected to a network switch or router (not shown in FIG. 4) to communicatively couple the IP communication interface 430 to multiple IP nodes 405. In another example, IP communication interface 430 is a wireless network communication interface, and IP communication interface 430 is communicatively couplable to multiple IP nodes 405 via one or more wireless network connections (e.g., a wireless LAN hosted by IP communication interface 430 or an ad-hoc wireless LAN between IP communication interface 430 and IP nodes 405). In addition, or in the alternative, multiple IP communication interfaces 430 may be used to connect to multiple local networks and/or to provide redundant connections to one local network.

In some embodiments, gateway 120 communicates with a tactical node 405, 410, or 415 via an adapter external to gateway 120. In an exemplary embodiment, gateway 120 is communicatively coupled to one or more Link 16 nodes via Link 16-to-IP adapter 445. Link 16-to-IP adapter 445 includes an IP communication interface 450, which is communicatively couplable to an IP communication interface 430 of gateway 120. Link 16-to-IP-adapter 445 also includes a Link 16 communication interface 455, which is communicatively couplable to one or more Link 16 nodes 410. Link 16-to-IP adapter 445 facilitates IP-based communication between gateway 120 and Link 16 nodes 410, regardless of whether gateway 120 includes Link 16 communication interface 435. Similarly, serial communication interface 440 is an IP communication interface communicatively couplable to one or more serial nodes 415 via a serial-to-IP adapter (not shown in FIG. 4). In addition, or in the alternative, serial communication interface 440 may include a serial-to-IP adapter, internal or external to gateway 120.

In an exemplary embodiment, gateway 120 includes IP communication interfaces 430, Link 16 communication interface 435, and serial communication interface 440. Other non-IP communication interfaces suitable for communicating, directly or indirectly, with tactical nodes are also contemplated.

Gateway 120 also includes a plurality of GIG communication interfaces 460 for communicatively coupling gateway 120 to GIG 105. GIG communication interfaces 460 may include, but are not limited to, wired IP communication interfaces, wireless IP communication interfaces, and/or satellite communication interfaces. In some embodiments, a single hardware device, such as an Ethernet adapter, is configured to provide multiple GIG communication interfaces 460. For example, the Ethernet adapter may be configured to receive messages for and transmit messages from multiple IP addresses.

Gateway 120 also includes one or more inter-gateway communication interfaces 465. In the exemplary embodiment, inter-gateway communication interface 465 is directly communicatively couplable to one or more other gateways 120. In addition, or in the alternative, inter-gateway communication interface 465 is communicatively couplable to one or more other gateways 120 via GIG 105 and/or tactical network cloud 130, with or without the use of a virtual network, such as a VPN. In some embodiments, a plurality of gateways 120 communicate with each other via a mesh network, such as a mobile ad-hoc network (MANET).

Figure 5:
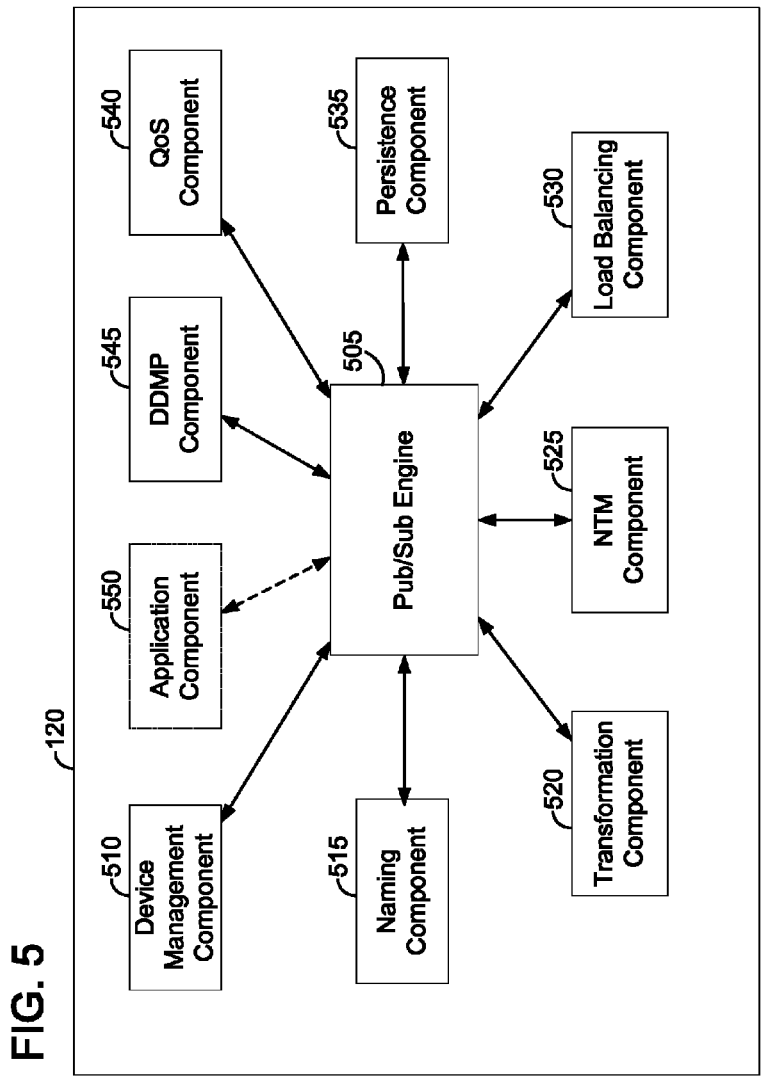
FIG. 5 is a block diagram of functional components according to an exemplary configuration of the gateway shown in FIG. 1.

FIG. 5 is a block diagram of functional components according to an exemplary configuration of gateway 120. In one embodiment, components are implemented as executable instructions stored in or embodied in memory area 425 (shown in FIG. 4). When executed by processor 420 (also shown in FIG. 4), the instructions cause processor 420 to perform the operations described below.

Gateway 120 includes a middleware component having a publish/subscribe (pub/sub) engine 505, which routes messages between the other functional components of gateway 120. In addition, the other functional components may communicate with each other via a communication channel such as a remote procedure call (RPC) and/or inter-process communication (IPC). In the exemplary embodiment, one or more components subscribes to pub/sub engine 505 for a certain type of message. A second component publishes ("produces") messages of that type to pub/sub engine 505, and pub/sub engine 505 transmits the message to all components which have subscribed to the message type. Each subscribed component receives ("consumes") the message. Because message forwarding is managed by pub/sub engine 505, a component publishing a message requires no configuration regarding other components which may require receipt of the message.

Gateway 120 may include several functional components in addition to pub/sub engine 505. In the exemplary embodiment, gateway 120 includes a device management component 510, a naming component 515, a transformation component 520, a network topology management (NTM) component 525, a load balancing component 530, a persistence component 535, a quality of service (QoS) component 540, a data-driven message processing (DDMP) component 545, and, optionally, one or more application components 550, all of which are described in more detail below. Each of components 510, 515, 520, 525, 530, 535, 540, 545, and 550 may submit a request and/or a query, as described herein, to another component via pub/sub engine 505. Components 510, 515, 520, 525, 530, 535, 540, 545, and 550 may reply to a request and/or query by submitting a response via pub/sub engine 505 and/or by submitting a response directly to the submitter of the request and/or query (e.g., via RPC and/or IPC). Similarly, components 510, 515, 520, 525, 530, 535, 540, 545, and 550 may initiate communication with each other directly, via RPC, IPC, and/or any other suitable communication means.

Figure 6:
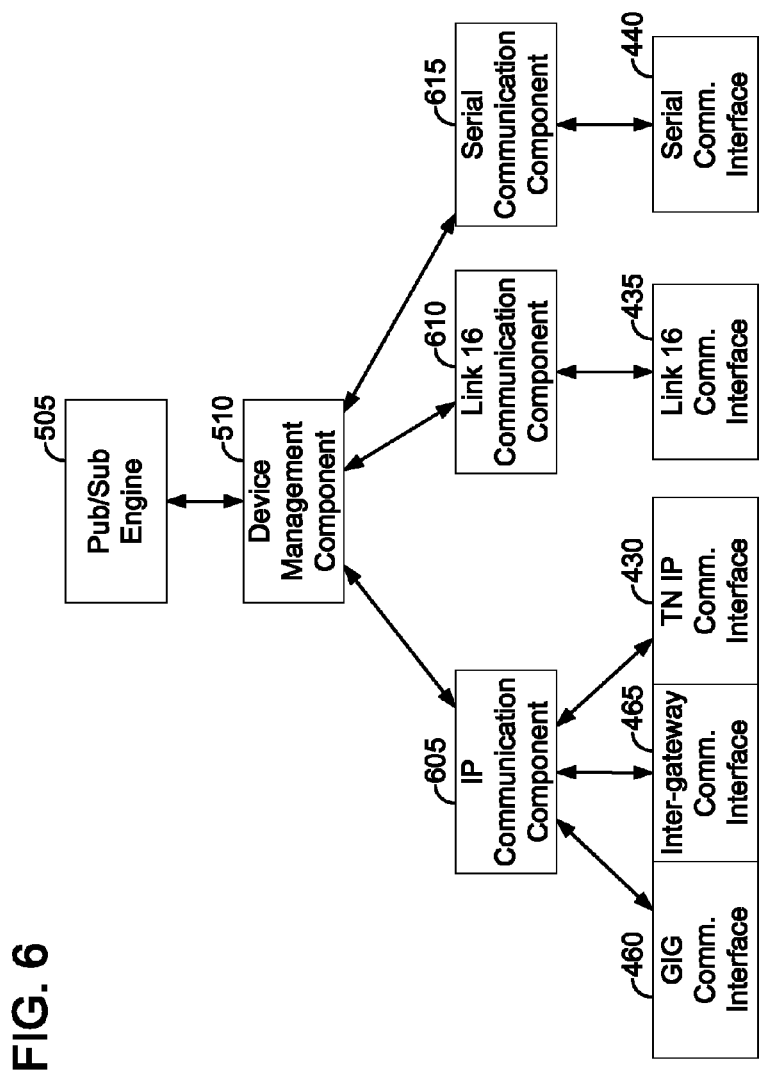
FIG. 6 is a block diagram of the device management component shown in FIG. 5 in communication with a plurality of communication interfaces.

FIG. 6 is a block diagram of device management component 510 in communication with pub/sub engine 505 and communication interfaces 465, 460, 430, 435, and 440 (shown in FIG. 4). In the exemplary embodiment, inter-gateway communication interface 465, GIG communication interface 460, and IP communication interface 430 provide IP-based communication capability. Device management component 510 is communicatively coupled to communication interfaces 465, 460, and 430 via an IP communication component 605. Device management component 510 is communicatively coupled to Link 16 communication interface 435 via a Link 16 communication component 610 and to serial communication interface 440 via a serial communication component 615. Communication components 605, 610, and 615 may include, but are not limited to, a network stack and/or a software-based interface for operating a communication interface 465, 460, 430, 435, and/or 440. In addition, or in the alternative components 515, 520, 525, 530, 535, 540, 545, and 550 may communicate with communication components 605, 610, and 615 via a communication channel, such as RPC and/or IPC, rather than communicating via pub/sub engine 505.

Device management component 510 detects and/or communicates with other devices (shown in FIG. 1) via communication interfaces 465, 460, 430, 435, and/or 440. Device management component 510 is programmed to receive a message from a tactical node 125 and determine a local identifier for the tactical node 125. The local identifier may be a hardware identifier such as a media access control (MAC) address, a local network address such as an IP address, a node identifier from a Precise Participant Location and Identification (PPLI) message, or any other device suitable for indicating a particular tactical node 125. Device management component 510 may also determine a device type (e.g., a sensor or a robotic device) for a detected tactical node 125. For example, a tactical node 125 may communicate a device type indicator to device management component 510, or device management component 510 may determine a device type based on a header and/or content of a message form the tactical node 125. Device management component 510 publishes a tactical node availability message 125 (e.g., via pub/sub engine 505), including, for example, a local identifier and/or a device type for the tactical node 125. Device management component 510 may also transmit a tactical node availability message to one or more other gateways 120 and/or GIG nodes 110.

In one embodiment, device management component 510 detects another gateway 120 via IP communication component 605 and inter-gateway communication interface 465. In response, device management component 510 publishes a gateway availability message (e.g., to pub/sub engine 505).

In the exemplary embodiment, gateway 120 includes serial communication interface 440 and serial communication component 615 for communicating with one or more serial nodes 415. Serial nodes 415 include, but are not limited to, sensors, such as temperature sensors, barometers, hygrometers, anemometers, speedometers, altimeters, inclinometers, pressure sensors, and electrical switches. Serial nodes 415 may also include, for example, global positioning system (GPS) receivers, microphones, cameras, instrumentation, and remotely controllable devices (e.g., motors). A serial node 415 (e.g., a sensor) may provide a continuous or periodic signal to serial communication interface 440, and serial communication component 615 may periodically publish messages (e.g., to pub/sub engine 505) based on the signal(s) from the serial device. For example, serial communication component 615 may sample a continuous signal to produce a message according to a predetermined frequency (e.g., once every second or once every five seconds). Other serial nodes 415 may interact with gateway 120 and/or an operator. For example, a serial node 415 may accept a command or request from serial communication interface 440 and respond to the command or request.

In one embodiment, a tactical node 125 periodically transmits a "keep-alive" message, which indicates the tactical node 125 is operable. Device management component 510 detects the presence of the tactical node 125 by receiving the keep-alive message. The keep-alive message includes a local identifier of the tactical node. If the device is not registered with gateway 120, device management component 510 registers the tactical node 125 by publishing a device registration message to pub/sub engine 505. The device registration message includes a local identifier for the node. Device management component 510 monitors transmissions from registered tactical nodes 125. If device management component 510 determines that it is no longer receiving keep-alive messages from a tactical node 125, device management component 510 publishes a device deregistration message for the tactical node 125 to pub/sub engine 505. In some cases, a tactical node 125 transmits a departure message prior to becoming inoperable or not present. For example, a tactical node 125 may transmit a departure message in response to determining that it is passing out of communication range with gateway 120 or that a planned or unplanned operational outage is approaching. When device management component 510 determines that a registered tactical node 125 is inoperable or not present, device management component 510 publishes a device deregistration message to pub/sub engine 505.

In addition, or in the alternative, device management component 510 periodically transmits a request (e.g., a "ping" request) to the tactical node 125 and determines whether the tactical node 125 is operable based on whether it receives a response to the request from the tactical node 125. Device management component 510 may broadcast or multicast the request such that multiple tactical nodes 125 receive and respond to the request. Device management component 510 detects the presence of a tactical node 125 by receiving a response to the request. If device management component 510 does not receive a response from a tactical node 125 it has previously registered, device management component 510 determines that the tactical node 125 is inoperable or no longer present.

In the exemplary embodiment, device management component 510 facilitates communication between gateway 120 and external devices, such as a tactical node 125, a GIG node 110, another gateway 120, or address resolution server 115. Device management component 510 is programmed to receive a message from an external device via a communication component 605, 610, or 615 and publish the message to pub/sub engine 505, facilitating processing of the incoming message by other components. Device management component 510 also registers with pub/sub engine 505 for outgoing messages. When another component publishes an outgoing message for an external device, pub/sub engine 505 notifies device management component 510 as a result of its registration, and device management component 510 transmits the message to the external device via a communication component 605, 610, or 615.

In some embodiments, device management component 510 associates a device descriptor with an external device such as a tactical node 125. A device descriptor includes, but is not limited to, a device class or type, a device location, a device network parameter, a device manufacturer, a device model, a device capability, a sensor type, a sensor resolution, a sensor sampling rate, a configuration parameter, a remotely configurable parameter descriptor, a locally configurable parameter descriptor, a processing capacity indicator, a memory capacity and/or usage indicator, a device service descriptor, a command descriptor, a device command access restriction, and/or a communications protocol. A service descriptor may include, for example, a service name indicating a business-related or data-related function performed by the device. Exemplary functions include the provision of sensor readings, data translation, execution of proprietary algorithms for data processing, routing of data through proprietary network protocol adapters, and sensor network interfacing. A command descriptor may include, without limitation, a command name, an access restriction, and/or a parameter descriptor. A parameter descriptor may include, for example, a parameter name, a parameter type (e.g., scalar, array, Boolean, or string), and/or a range of legal values (e.g., positive integers or real numbers between zero and one).

In some embodiments, device management component 510 automatically associates a device descriptor with an external device. In one embodiment, device management component 510 includes a set of node types, each of which is associated with a device descriptor, and device management component determines a device descriptor for an external device based on a node type of the device. For example, the external device may provide a node type indicator (e.g., in a message header or as a USB class code), or device management component 510 may determine a node type based on one or more messages from the external device. In addition, or in the alternative, device management component 510 may include a statically or manually defined node type and/or device descriptor for one or more external devices. Device descriptors and/or node types may be configured locally at gateway 120 and/or uploaded to gateway 120 from an external device.

In one embodiment, device management component 510 includes in a device registration message for an external device one or more attributes from a device descriptor associated with the device. For example, device management component 510 may include one or more command descriptors for a tactical node 125.

Device management component 510 may perform command validation. For example, before transmitting a command to a tactical node 125, device management component 510 may validate the command based on one or more command descriptors from the device descriptor associated with the tactical node 125. If the validation fails, device management component 510 rejects the command, optionally publishing a command validation error to pub/sub engine 505.

In some embodiments, prior to publishing an incoming message from a tactical node 125 to pub/sub engine 505, device management component 510 preprocesses the message. For example, device management component 510 may combine multiple transmissions from a tactical node 125 into a single message. In one embodiment, device management component 510 preprocesses a message based on a device descriptor for the tactical node 125. For example, device management component 510 may parse message content based on a communication protocol or message format defined in the device descriptor. In addition, or in the alternative, device management component 510 may associate one or more metadata tags with the message. For example, a tag may indicate the local identifier of the tactical node 125, a location of the tactical node 125, or any other attribute of the tactical node 125. If the message from the tactical node 125 is a response to a message submitted by a sender (e.g., another component in gateway 120 or an external device), device management component 510 may associate with the message a recipient tag corresponding to the sender.

In one embodiment device management component 510 facilitates querying for external devices. For example device management component may subscribe to pub/sub engine 505 for tactical node queries. Other components may query for tactical nodes 125 at gateway 120 by publishing a tactical node query to pub/sub engine 505. In response, device management component 510 identifies a set of tactical nodes 125 meeting the criteria (if any) in the tactical node query and publishes, for each tactical node 125 in the set, a tactical node descriptor including one or more attributes from the device descriptor associated with the tactical node 125. In addition, or in the alternative, device management component 510 may receive a tactical node query from an external device, identify a set of matching tactical nodes 125, and transmit to the external device a tactical node descriptor for each member of the set. Device management component 510 may include one or more tactical node descriptors in a tactical node availability message.

If a tactical node 125 supports remote configuration, device management component 510 may include a remote configuration parameter descriptor in a tactical node descriptor. If device management component 510 receives a configuration parameter for the tactical node (e.g., included in a configuration command), device management component 510 may enforce a security policy prior to transmitting the configuration parameter to the tactical node 125. In one embodiment, device management component 510 is configured to receive a configuration command for a tactical node 125, including sender credentials (e.g., a sender identifier, a sender role, and/or a sender location, whether geographical or relative to the network). Device management component determines an access restriction for the configuration command from the device descriptor associated with the tactical node 125 and rejects the received configuration command if the sender credentials do not satisfy the access restriction. An access restriction may include, for example, a set of permitted sender credentials (a "whitelist") and/or a set of prohibited sender credentials (a "blacklist").

Naming component 515 facilitates managing a collection of global addresses assigned to a gateway 120, assigning a global and/or local address to a tactical node 125, and querying for a global and/or local address of a tactical node 125 based on a name. Naming component 515 interacts with a naming repository in memory area 425.

In the exemplary embodiment, naming component 515 maintains a collection of global network addresses associated with gateway 120. For example, gateway 120 may be allocated a collection of global IP address (e.g., by address resolution server 115), and naming component 515 may store the allocated addresses in the naming repository. Naming component 515 registers a subscription for device registration messages, device deregistration messages, and address query messages with pub/sub engine 505.

Naming component 515 is programmed to receive a device registration message for a tactical node 125 and, in response, select an allocated global address from the naming repository and associate the address with the tactical node 125 in the naming repository. For example, naming component 515 may associate the address with a name and/or a local address of the tactical node 125 from the device registration message. The global address is used as the source address for outgoing messages forwarded from the tactical node 125 to GIG 105 by gateway 120. The global address is also used as the destination address for incoming messages from GIG 105 directed to the tactical node 125. After associating the tactical node 125 with a global address, naming component 515 optionally publishes an address assignment message to pub/sub engine 505. In one embodiment, naming component 515 receives a device registration message for a tactical node 125 including a local identifier and not including a name. Naming component 515 determines a name for the tactical node 125, associates the determined name with the selected address in the naming repository, and includes the determined name in an address assignment message published to pub/sub engine 505.

When naming component 515 receives a device deregistration message for a tactical node from pub/sub engine 505, naming component 515 identifies a global address associated with the tactical node in the naming repository and disassociates the global address from the tactical node 125, making the global address available for another tactical node 125. After performing the disassociation, naming component 515 optionally publishes an address disassociation message to pub/sub engine 505.

Naming component 515 is further programmed to receive an address query message for a tactical node 125 from pub/sub engine 505 and identify a tactical node reference in the address query message. A tactical node reference may include, for example, a name or an address of a tactical node 125. Naming component 515 identifies a global address, a local address, and/or a name corresponding to the tactical node reference in the naming repository. For example, if the tactical node reference is a name, naming component 515 may execute a query in the naming repository for a global and/or local address associated with the name. Similarly, if the tactical node reference is a global address, naming component 515 may execute a query for a local address and/or a name associated with the global address. Naming component 515 responds to the query request with the global address, local address, and/or name (e.g., by publishing an address query result message to pub/sub engine 505).

In one embodiment, naming component 515 determines whether the sender of the address query message is a component or another tactical node 125 communicatively coupled to gateway 120. If so, naming component 515 responds to the address query message with a local address corresponding to the tactical node reference. Returning a local address to a local sender facilitates an elimination of unnecessary routing through GIG 105, thereby also facilitating a reduction of latency in communication and a reduction in bandwidth usage between gateway 120 and GIG 105.

In some embodiments, naming component 515 interacts, directly or indirectly, with address resolution server 115. For example, naming component 515 may transmit an address assignment message to address resolution server 115, or another component, such as device management component 510, may forward an address assignment message published by naming component 515 to address resolution server 115. A similar delivery method may be used to transmit an address disassociation message to address resolution server 115.

In one embodiment, naming component 515 also receives address query messages for GIG nodes 110 and/or remote tactical nodes 125. Such address query messages originate from another gateway 120, another component in gateway 120, and/or a tactical node 125 communicatively coupled to gateway 120. Naming component 515 may function as a simple proxy to address resolution server 115, or may also maintain a local cache of name-address associations. The cache may be populated statically or based on results of address lookups for which naming component 515 functions as a proxy.

Transformation component 520 provides services for data translation, cryptography, encoding, decoding, and/or other data transformations. Transformation component 520 interacts with a format repository in memory area 425. The format repository includes a plurality of message format descriptors for various message formats supported by gateway 120. Exemplary message formats include, without limitation, Cursor on Target (CoT), Distributed Interactive Simulation (DIS), Link 16 J-Series, Link 16/SimpleJ, Joint Range Extension Applications Protocol (JREAP), Joint Effects Based Command and Control (JEBC2), and Common Alerting Protocol (CAP). Transformation component 520 may be configured to support a new communication standard by adding a corresponding message format descriptor to the format repository of transformation component 520. Message format descriptors are structured such that any message type can be translated to any other message type by transformation component 520.

Transformation component 520 is programmed to register with pub/sub engine 505 a subscription for message transformation requests. A message transformation request includes an original message. Transformation component 520 is further programmed to receive a transformation request and determine what type of transformation is required based on the request. For example, a transformation request may include a transformation indicator. In addition, or alternatively, transformation component 520 may determine a required transformation based on the original message, a source reference, and/or a destination reference from the transformation request. In one embodiment, transformation component 520 determines a required transformation based on a device descriptor associated with the source and/or a device descriptor associated with the destination. For example, a device descriptor may include a message format descriptor or a reference to a message format descriptor.

In one embodiment, transformation component 520 identifies a source message format descriptor associated with the source of the original message and a destination message format descriptor associated with the destination of the original message. If the source message format descriptor is different from the destination message format descriptor, transformation component 520 identifies fields within the original message based on the source message data/format descriptor and creates a translated message based on the identified fields and the destination message format descriptor. Transformation component 520 publishes the translated message to pub/sub engine 505.

Because message formats may have different payload capacities, translation of one message or packet may result in one or more translated messages or packets. Such segmentation of messages does not adversely affect the operation of gateway 120, however. Transformation component 520 simply publishes as many messages as required to pub/sub engine 505, and all published messages are provided to the subscribers independently. The subscribers may process each one of the messages as if they were replications of the original message.

In some embodiments, transformation component 520 performs multicast-to-unicast transformation. For example, a message transformation request and/or an original message may include a destination reference that refers to a plurality of destinations. A destination reference may individually address each destination, address a group of destinations, and/or addressing a network. Transformation component 520 determines the individual destinations corresponding to the destination reference and, for each individual destination, publishes a message addressed to the destination to pub/sub engine 505. Transformation component 520 may perform one or more other transformations (e.g., translation) on the original message prior to publishing messages to individual destinations.

Network topology management component 525 facilitates discovery and communication of available gateways 120, services provided by gateways 120, host attributes of gateways 120, and/or link attributes of communication connections between gateways 120 and/or GIG 105. Network topology management component interacts with a topology repository in memory area 425.

When a gateway 120 becomes operational (e.g., when it is powered on), it searches for existing local networks using inter-gateway communication interface 465. If gateway 120 identifies a local network, gateway 120 joins the network, and network topology management component 525 transmits a service availability message to one or more other gateways 120 on the network, including a gateway identifier of gateway 120 and a service descriptor for one or more services provided by gateway 120. Services include, for example, any processing functions provided by the components illustrated in FIG. 5. In an exemplary embodiment, network topology management component 525 broadcasts a service availability message to the network.

Network topology management component 525 is programmed to register with pub/sub engine 505 a subscription for service availability messages. A service availability message includes a gateway identifier for a gateway 120 and a service descriptor for each of one or more services provided by the gateway 120. A service descriptor includes, for example, a service name. When a service availability message is received (e.g., via inter-gateway communication interface 465 and device management component 510), the message is published to pub/sub engine 505. Network topology management component 525 is programmed to receive the service availability message and associate the gateway identifier with the service descriptors in the topology repository.

Network topology management component 525 is also programmed to register with pub/sub engine 505 a subscription for service query messages. A service query message includes one or more service criteria, such as, but not limited to, a service name and/or a gateway identifier. Network topology management component 525 is programmed to receive a service query message and identify within the topology repository one or more service descriptors matching the service criteria. Network topology management component 525 publishes to pub/sub engine 505 a service query response message, including the identified service descriptor(s) and associated gateway identifier(s). Network topology management component 525 thereby facilitates propagation and discovery of services provided by components (e.g., application component 550) executing at various gateways 120.

Network topology management component 525 further registers with pub/sub engine 505 a subscription for gateway attribute messages. A gateway attribute message includes, for example, a gateway identifier and one or more gateway attributes, such as a location (e.g., geographic or relative to a network), a processing capacity indicator, a processing usage indicator, a memory capacity indicator, and/or a memory usage indicator. A gateway identifier is associated with one or more gateway attributes in the topology repository.

Other gateways 120 may transmit gateway attribute messages periodically or upon a significant change to one or more gateway attributes previously communicated in a gateway attribute message, though other timings are also contemplated. A significant change may be defined as a percentage change over a predetermined threshold, such as 10%, 25%, or 50%. In one embodiment, each gateway 120 hosts an instance of network topology management component 525 that monitors the host on which it executes. The instance collects the host gateway's resource data, including total processing capacity, present loading, memory capacity, usage and services hosted on or available at the gateway. These attributes are scored by rules that are derived from the gateway environment, host platforms and edge devices. This scoring system provides normalized resource measurements that represent the gateway or node's capabilities relative to other computing platforms in the network. The normalized resource measurements are communicated to other gateways 120 through one or more gateway attribute messages.

In addition, or in the alternative, network topology management component 525 or another component in gateway 120 queries another gateway 120 for services provided by the other gateway 120 and associates a gateway identifier and one or more service descriptors for the other gateway 120 in topology repository. Network topology management component 525 may also associate in the topology repository a gateway identifier for the gateway 120 on which it executes with one or more service descriptors for services provided by the gateway 120 on which it executes.

In one embodiment, device management component 510 receives a gateway attribute message via inter-gateway communication interface 465 and publishes the message to pub/sub engine 505. Network topology management component 525 receives the gateway attribute message from pub/sub engine 505, identifies within the message a gateway identifier and one or more gateway attributes, and associates the gateway identifier with the one or more gateway attributes in the topology repository.

Network topology management component 525 also registers with pub/sub engine 505 a subscription for gateway attribute query messages. A gateway attribute query message includes one or more gateway attribute criteria, such as, but not limited to, a processing capacity criterion, a processing usage criterion, a memory capacity criterion, a memory usage criterion, and/or a gateway identifier. When network topology management component 525 receives a gateway attribute query message, network topology management component 525 identifies within topology repository one or more gateway identifiers matching the gateway attribute criteria. Network topology management component 525 publishes to pub/sub engine 505 a gateway attribute query response message, including the identified gateway identifier(s) and, optionally, one or more gateway attributes associated with each gateway identifier.

Network topology management component 525 further registers with pub/sub engine 505 a subscription for link attribute messages. A link attribute message includes, for example, two link endpoint identifiers (e.g., a gateway identifier and/or a GIG identifier) and one or more link attributes corresponding to communication between the endpoints, such as a bandwidth capacity indicator, a bandwidth usage indicator, a latency indicator, a link uptime indicator, a link quality indicator, a dropped packet metric, and/or a relative location (e.g., geographic or within a network) of the endpoints. Network topology management component 525 associates a pair of endpoint identifiers with one or more link attributes in the topology repository.

Other gateways 120 may transmit link attribute messages periodically or upon a significant change to one or more link attributes previously communicated in a link attribute message, though other timings are also contemplated. In addition, or in the alternative, network topology management component 525 or another component in gateway 120 determines one or more link attributes for communication between the gateway 120 on which it executes (one endpoint) and another gateway 120 or GIG 105 (the other endpoint) and associates a pair of identifiers for the endpoints with the determined link attribute(s).

In one embodiment, device management component 510 receives a link attribute message via inter-gateway communication interface 465 and publishes the message to pub/sub engine 505. Network topology management component 525 receives the link attribute message from pub/sub engine 505, identifies within the message a pair of endpoint identifiers and one or more link attributes, and associates the pair of endpoint identifiers with the one or more gateway attributes in the topology repository.

Network topology management component 525 also registers with pub/sub engine 505 a subscription for link attribute query messages. A link attribute query message includes one or more link attribute criteria, such as, but not limited to, an endpoint criterion, a bandwidth capacity criterion, a bandwidth usage criterion, a latency criterion, a link uptime criterion, a link quality criterion, and/or a dropped packet criterion. When network topology management component 525 receives a link attribute query message, network topology management component 525 identifies within topology repository one or more endpoint identifier pairs matching the link attribute criteria. Network topology management component 525 publishes to pub/sub engine 505 a link attribute query response message, including the identified endpoint identifier pair(s) and, optionally, one or more link attributes associated with each endpoint identifier pair.

Load balancing component 530 facilitates effective and efficient use of bandwidth, computing, and storage resources among multiple gateways 120. As illustrated in FIGS. 1 and 4, gateways 120 may be communicatively coupled to each other. Furthermore, as described above, gateways may share information regarding services, gateway attributes, and link attributes with each other, and this information may be managed by network topology management component 525.

Components within a gateway 120 may require data retrieval and/or processing provided by other components. Generally, another component executing on the same gateway 120 may be used to perform such data retrieval and/or processing. However, due to constraints such as processing, memory, and/or communication limitations, local execution may be inefficient or impossible. Accordingly, load balancing component 530 facilitates distributing execution, storage, and communication loads from a local host to a remote host.

Load balancing component 530 registers with pub/sub engine 505 a subscription for load balancing request messages. A load balancing request message includes, for example, a service identifier, an operation identifier, and/or request data, such as data on which a service or operation is requested to operate. When load balancing component 530 receives a load balancing request message, load balancing component 530 determines an optimal execution target. The optimal execution target may be any gateway 120, including the machine on which load balancing component 530 executes. Load balancing component 530 responds by publishing a load balancing decision message, including an identifier of the optimal execution target, to pub/sub engine 505. A load balancing request message may be published to pub/sub engine 505 by any component in gateway 120. For example, a component requiring translation of a message may publish a load balancing request message including a transformation service indicator, a translation operation indicator, and/or the message to be translated. In addition, or alternatively, transformation component 520 may publish a load balancing request message A load balancing decision message published by load balancing component 530 may be received by the component that published the corresponding load balancing request message. In addition, or alternatively, a load balancing decision message may be received by another component, such as device management component 510, which transmits an execution request message to the optimal execution target referenced by the load balancing decision message.

In one embodiment, a component providing a service publishes (e.g., to pub/sub engine 505) a load balancing request message including an identifier of a service and/or an operation the component provides. Load balancing component 530 receives the request message and responds by publishing a load balancing decision message (e.g., to pub/sub engine 505). The requesting component receives the load balancing decision message and identifies within the decision message an optimal execution target. The requesting component receives an execution request for the service it provides and, in response, publishes a new execution request (e.g., to pub/sub engine 505) based on the received execution request and referencing the optimal execution target. Device management component 510 receives the new execution request, optionally after one or more other components (e.g., transformation component 520) have processed the request, and transmits the execution request to the optimal execution target (e.g., another gateway 120).

In an alternative embodiment, another component, such as DDMP component 545, which is described below, determines one or more services required for processing a message. DDMP component 545 submits a load balancing request message for at least one of the determined services. DDMP component 545 receives from load balancing component 530 an optimal execution target for the service(s) and transmits an execution request to the optimal execution target for each service.

In an exemplary embodiment, load balancing component 530 determines an optimal execution target by calculating the cost effectiveness of utilizing a service at a particular location, such as a remote gateway 120. Cost effectiveness is calculated based on the cost of transmitting data to the remote location, the cost of storage of that data at the remote location, and/or the cost of processing the data at the remote location. A cost includes, without limitation, an estimated duration and/or an incremental resource usage indicator. An incremental resource usage indicator expresses the additional processing, storage, and/or communication load incurred by transferring execution to a location. An incremental resource usage indicator may be expressed as a percentage of total capacity or a percentage of available capacity (total capacity minus current usage), for example.

In one embodiment, load balancing component 530 retrieves gateway attributes and/or link attributes from network topology management component 525. Load balancing component 530 publishes to pub/sub engine 505 a gateway attribute query message and/or a link attribute query message, optionally including one or more gateway attribute criteria and/or link attribute criteria. For example, load balancing component 530 may include criteria limiting the query to gateways 120 and/or links proximate to the gateway 120 on which load balancing component 530 executes. In addition, or alternatively, load balancing component 530 may include criteria specifying one or more capacity indicators and/or usage indicators. Network topology management component 525 responds by publishing a gateway attribute query response message.

Load balancing component 530 may react to changing network topology. In some embodiments, load balancing component 530 registers with pub/sub engine 505 a subscription for gateway availability messages and/or service availability messages. When load balancing component 530 receives such a message, it repeats the determination of an optimal execution target for an earlier received load balancing request. If the newly determined target differs from the originally determined target, load balancing component 530 publishes a new load balancing decision including the new optimal execution target.

In one example, transformation component 520 performs traffic filtering. Transformation component 520 publishes a load balancing request message, including a traffic filtering service identifier and/or a traffic filtering operation identifier. Load balancing component 530 determines, via a service query message that is processed by network topology management component 525, that no other gateways 120 providing the traffic filtering service are available. Load balancing component 530 indicates to transformation component 520 (e.g., by publishing a load balancing decision message) that the gateway 120 on which transformation component 520 executes is the optimal execution target. A second gateway 120 becomes available and is detected by network topology management component 525. Network topology management component 525 publishes a gateway availability message and/or a service availability message indicating that the traffic filtering service is available at the second gateway 120. Load balancing component 530 receives the availability message(s) from pub/sub engine 505. Load balancing component 530 publishes to pub/sub engine 505 a gateway attribute query message, specifying an identifier of the second gateway 120 in the gateway attribute criteria. In addition, or in the alternative, load balancing component 530 publishes to pub/sub engine 505 a link attribute query message, specifying the second gateway 120 as an endpoint. In response, load balancing component 530 receives from pub/sub engine 505 a gateway attribute query response message including gateway attributes for the second gateway 120 and/or a link attribute query response message including link attributes for connections associated with the second gateway 120. Load balancing component 530 calculates the cost effectiveness of using the traffic filtering service at each of the gateways 120 based on the received gateway attributes and/or link attributes. If utilizing the service at the second gateway 120 is more cost effective, load balancing component 530 publishes to pub/sub engine 505 a load balancing decision message indicating that the second gateway 120 is the optimal execution target for traffic filtering service requests.

Persistence component 535 facilitates a reduction in bandwidth usage and a reduction in latency for requests accessing data from or via a gateway 120. Transferring data between any two nodes in a network, such as between a GIG node 110 and a gateway 120 or between gateways 120, necessarily incurs some delay related to transmission and reception of a signal conveying the data. This delay is known as "latency". Reducing the quantity of requests a first gateway 120 is required to transmit to other gateways 120 in response to a request received at the first gateway 120 reduces the latency incurred for the received request. Accordingly, persistence component 535 further facilitates reactive caching and proactive (predictive) fetching of remotely hosted data for one or more other components in gateway 120.

Persistence component 535 is programmed to register with pub/sub engine 505 subscriptions for data storage messages, data availability messages, data retrieval messages, and data pre-fetch messages. In some embodiments, components within gateway 120 store data in a repository and/or in memory area 425 by publishing a data storage message including data content and one or more metadata elements. A metadata element may include a unique identifier of the data content, a time (e.g., a timestamp including a date and time) at which the data content was produced and/or received, an aging constraint indicating when the data content is to be considered invalid, inaccurate, and/or stale, a data type (e.g., still image, video sequence, audio sequence, sensor reading), a data creator (e.g., a human operator or automated system), a geographic location and/or orientation corresponding to the data content, and/or any information that describes the data content.

In response to receiving a data storage message, persistence component 535 stores the data content and associates the data content with the metadata elements in a data repository within memory area 425. In one embodiment, persistence component 535 publishes a data availability message to pub/sub engine, including one or more of the metadata elements. Device management component 510 subscribes for data availability messages and receives the message from persistence component 535. Device management component transmits the data availability message, including an identifier of the local gateway 120, to one or more other gateways 120.

When device management component 510 receives a data availability message from another gateway 120, device management component 510 publishes the data availability message to pub/sub engine 505. Persistence component 535, as a result of its subscription for such messages, receives the data availability message. Persistence component 535 stores the gateway identifier and the metadata elements from the data availability message in the data repository.

Persistence component 535 is also programmed to receive a data retrieval message from pub/sub engine 505. A data retrieval message includes, for example, one or more metadata criteria.

In one example, an operator at a GIG node 110 requests imagery data for a particular location. Device management component 510 receives the request from the GIG node 110 and publishes a data retrieval message to pub/sub engine 505, including metadata criteria specifying a data type of still image and a particular geographic location. Persistence component 535 receives the data retrieval message, queries the data repository for data matching the metadata criteria, and receives a query response from the data repository.

If persistence component 535 determines, based on the query response, that data content meeting the criteria are available in the data repository, persistence component 535 publishes a data retrieval response message to pub/sub engine 505, including the data content corresponding to the criteria. Device management component 510 is configured to subscribe for data retrieval response messages and transmit the data content to the GIG node 110 that submitted the request.

If persistence component 535 instead determines that data content meeting the criteria are not available in the data repository but are available at another gateway 120, persistence component 535 requests the corresponding data content from the other gateway 120. In one embodiment, persistence component 535 publishes to pub/sub engine 505 a data retrieval message including an identifier of the other gateway 120, and device management component 510 transmits the data retrieval message to the other gateway 120. Device management component 510 receives the corresponding data content from the other gateway 120 (e.g., as a data retrieval response message) and publishes a data retrieval response message with the data content to pub/sub engine 505. Persistence component 535 publishes a data retrieval response to pub/sub engine 505, and data management component 510 forwards the data content to the GIG node 110 that submitted the request. In some embodiments, persistence component stores the data content from the other gateway 120 in the data repository, as described in more detail below.

If persistence component 535 determines, based on the query response, that the data repository has no record of data meeting the criteria, persistence component 535 publishes a data retrieval response message to pub/sub engine 505, indicating that the data could not be found, and data management component 510 transmits the data retrieval response message to the GIG node 110. In addition, or alternatively, persistence component 535 publishes a data retrieval message for one or more other gateways 120, and device management component 510 transmits the data retrieval message(s) to the other gateway(s) 120. If another gateway 120 transmits a data retrieval response message indicating the requested data are available, persistence component 535 updates the data repository with metadata corresponding to the requested data and an identifier of the other gateway 120. Persistence component 535 requests the corresponding data content from the other gateway 120 and publishes a data retrieval response message with the data content. Device management component 510 receives the data retrieval response message and transmits the data content to the GIG node 110 that submitted the request.

In some embodiments, persistence component 535 caches data content retrieved from another gateway 120 in the data repository. Locally caching data content facilitates reducing bandwidth usage between gateways 120 and reducing latency in responding to a request for data (e.g., from a GIG node 110). Persistence component 535 also purges cached data from the data repository. For example, cached data content may be associated with metadata elements in the data repository, and persistence component 535 may delete the cached data based on a time at which the data content were retrieved and/or stored, a time at which the data content were produced, and/or a time at which the cached data were last accessed. If persistence component 535 receives a data retrieval message for data content that is in the local cache, persistence component 535 responds by providing the data content from the local cache rather than requesting the data from another gateway 120.

In some embodiments, persistence management 535 facilitates proactive caching of data. Proactive caching may be performed in a pre-fetch ("pull") configuration and/or a pre-send ("push") configuration.

In one embodiment, persistence component 535 provides a pre-fetch configuration interface for defining a pre-fetch configuration. For example, a user at gateway 120 or at a GIG node 110 may interact with the pre-fetch configuration interface. A pre-fetch configuration includes, for example, a request schedule and data criteria and/or metadata elements associated with data content. A request schedule defines a target time at which data content corresponding to a pre-fetch configuration are to be accessed. For example, a request schedule may indicate data content are to be accessed at 8:00 am each weekday.

Persistence component 535 retrieves data content matching the data criteria and/or metadata elements of a pre-fetch configuration according to the pre-fetch schedule. For example, if the data are to be accessed at 8:00 am, persistence component 535 may retrieve the data at any time between the previous retrieval and 8:00 am. A pre-fetch schedule may include a data age constraint (e.g., four hours), in which case persistence component 535 retrieves the data content based on the target access time and the data age constraint. For example, with a target access time of 8:00 am and a data age constraint of four hours, persistence component 535 would retrieve the data no earlier than 4:00 am. In some embodiments, persistence component 535 retrieves data based on gateway attributes and/or link attributes provided by network topology management component 525 and/or load balancing component 530. For example, persistence component 535 may identify a period of relatively low bandwidth usage between gateways 120 based on link attributes and pre-fetch data during the low bandwidth usage period.

Persistence component 535 stores pre-fetched data in the data repository and associates it with corresponding metadata elements. Persistence component 535 may purge pre-fetched data from the data repository on a subsequent pre-fetch according to the pre-fetch configuration. In addition, or alternatively, persistence component 535 may purge pre-fetched data according to an age constraint from the pre-fetch schedule.

In another embodiment, persistence component 535 determines data to pre-fetch. For example, persistence component 535 may store a data access record in the data repository for each data retrieval message. A data access record includes a time at which a data retrieval message was received and metadata criteria from the data retrieval message. Persistence component 535 then executes a one-time retrieval of data or creates one or more pre-fetch configurations based on the data access records. For example, persistence component 535 may identify an access pattern indicating that one or more data retrieval messages for a given set of identical or similar metadata criteria are received at approximately the same time each day. In response, persistence component 535 creates a pre-fetch configuration for a common set of metadata criteria from the identical or similar metadata criteria, including a pre-fetch schedule with a target access time substantially equal to the time at which the data retrieval messages are received.

In another embodiment, persistence component 535 determines data to pre-send to another gateway 120. For example, as described above, persistence component 535 may store data access records. In response to receiving a data retrieval message for data meeting a first set of metadata criteria, persistence component 535 retrieves from the data repository a first data content matching the first set of metadata criteria. Persistence component 535 also determines an access pattern based on the first set of metadata criteria. An access pattern indicates whether a request including one set of metadata criteria is likely to be received in temporal proximity to (e.g., within one minute of) a request including another set of metadata criteria. An occurrence may be considered likely if a historical occurrence rate, calculated from data access records, exceeds a predetermined threshold (e.g., 50% or 80%). For example, the two sets of metadata criteria may be substantially similar, differing by relatively small values and/or a relatively small number of criteria, such as geographic location, data type, and/or a time at which the data content was produced. Persistence component 535 determines a second set of metadata criteria based on the access pattern and retrieves from the data repository a second data content matching the second set of metadata criteria. Two sets of data content that are likely to be accessed in temporal proximity may be considered correlated to each other.

Persistence component 535 publishes to pub/sub engine 505 a data retrieval response message, including the first data content. In one embodiment, persistence component 535 also includes the second data content in the data retrieval response message. In an alternative embodiment, persistence component 535 publishes to pub/sub engine 505 a data pre-fetch message addressed to the other gateway 120, including the second data content. Device management component 510 is programmed to subscribe for data pre-fetch messages and transmit the data pre-fetch message to the other gateway 120. Persistence component 535 at the other gateway 120 receives the data pre-fetch message (e.g., via device management component 510 and pub/sub engine 505) and stores the data content from the data pre-fetch message in its data repository.

Quality of service (QoS) component 540 facilitates preventing traffic passing between GIG node 110 and gateway 120 or gateway 120 and gateway 120 from interfering with communication between tactical nodes 125 connected to a gateway 120. Effective operation of mission-critical applications is thereby enabled. In some embodiments, QoS component 540 interacts with a QoS policy repository in memory area 425.

QoS component 540 registers with pub/sub engine 505 a subscription for QoS processing request messages. A QoS processing request message includes, for example, a source indicator, a destination indicator, message content, QoS markings, and/or a priority indicator. When QoS component 540 receives a QoS processing message, QoS component 540 determines appropriate QoS treatment for the message content and publishes a QoS processing response message to pub/sub engine 505.

QoS component 540 may determine an appropriate QoS treatment for message content based on the communication interfaces, communication protocols, and/or message formats associated with the devices corresponding to the source indicator and the destination indicator. In some embodiments, gateway 120 communicates with at least some remote devices using IPv4 and/or IPv6 protocols, which enable end-to-end QoS in the form of Differentiated Services (DiffServ), such as defined by Internet Engineering Task Force (IETF) Request for Comments (RFC) 2474, with Explicit Congestion Notification (ECN), such as defined by IETF RFC 3168. In such embodiments, if the source and destination both support IP communication, QoS component 540 may simply copy QoS markings from the incoming message to the outgoing message, or QoS component 540 may modify the QoS marking based on a QoS policy in the QoS policy repository.

QoS may be implemented by defining a QoS policy for gateway 120, defining a QoS policy for a GIG node 110 or tactical node 125, defining a QoS policy for a communication standard or communication interface, and/or detecting a QoS policy based on the data received from the remote node. QoS markings corresponding to the defined or detected QoS policy may be added to data sent to a tactical node 125.

Based on QoS policies in the QoS repository, QoS component 540 may forward IP traffic using a tactical communication format (e.g., Link 16) with IP packet markings reflected in a prioritization scheme corresponding to the tactical communication format. The same can be done when forwarding from a non-IP tactical communication format to an IP network. Gateway 120 may schedule packets using QoS component 540, but for IP packets, additional scheduling may be performed using a kernel mode network traffic controller. The kernel mode network traffic controller scheduling may be handled by the operating system of gateway 120 or in dedicated hardware of gateway 120.

QoS management for non-IP waveforms may be handled as an overlay network service using QoS component 540. For example, QoS component 540 may discard ("drop") packets when a Link 16 traffic rate exceeds limits imposed by a policy of gateway 120. However, this capability is independent of any packet dropping performed at the kernel mode traffic controller, which is applicable to IP traffic. Gateway 120 may also provide queue and congestion management at QoS component 540 for Link 16 traffic, independent of any queue and congestion management performed at the kernel mode traffic controller for IP traffic. In addition, gateway 120 may limit the transmission rate of packets at QoS component 540 for non-IP waveforms such as Link 16, while the transmission rate control for IP traffic may be performed at the kernel mode traffic controller. Mapping of QoS mechanisms are specific to the traffic being forwarded from an IP network to a non-IP (e.g., Link 16) network, and vice-versa. This mapping may be based on policies configured at gateway 120.

For higher data bandwidth IP-based communication, gateway 120 may use a kernel mode network traffic controller. In an exemplary embodiment, QoS component 540 provides two main services: 1) A QoS application programming interface (API) through which QoS-aware applications may request certain levels of QoS for network connections, and 2) A mechanism for the underlying DiffServ implementation to adjust the service rates of its classes based on the available bandwidth as reported by the network device. QoS component 540 is implemented as a user-level daemon that listens on a local socket for requests from the QoS API and also listens on a network socket for reported changes to the available bandwidth of the network interfaces. QoS component 540 attempts to map a QoS request to a DiffServ class that will be able to provide the requested level of QoS. If successful, QoS component 540 creates a classifier to map the packets of that network connection to the appropriate DiffServ class. It also creates a policer for that classifier that will police that flow to the requested rate.

Some networks are physically secured (e.g., by passing network cables through pressurized conduit) and are referred to as "red" networks. Data may be safely transmitted within a red network in unencrypted or "plain text" form. Other networks, known as "black" networks, provide no guarantee of physical security and thus require that data be transmitted in encrypted or "cipher text" form. Generally, data passing between red network and a black network is encrypted through HAIPE. QoS information, however, may be allowed to bypass HAIPE in the red-to-black direction, the black-to-red direction, or both. The combination of these two end-to-end QoS network services may be used by a red side SOA-based gateway QoS network service to provide end-to-end QoS provisioning support to IP waveforms. However, QoS provisioning for non-IP waveforms may require the use of available native mechanisms or the deployment of an overlay QoS provisioning mechanism for the particular non-IP waveform.

QoS component 540 manages the DiffServ implementations on multiple IP communication interfaces 460, 465, 430. QoS component 540 may also support flow control for Link 16. For example, QoS component 540 may use a simple token bucket algorithm to control the amount of data that is introduced into a Link 16 network. In addition, gateway QoS component 540 may perform traffic prioritization, policing, and shaping for traffic being forwarded to a non-IP edge network waveform to ensure that offered traffic load does not exceed the bandwidth capacity.

In one embodiment, QoS component 540 assigns QoS markings to outgoing messages based on, for example, the QoS markings of incoming messages, local policies, and/or the outgoing communication interface and its current traffic load. Whether or not messages are translated between two different technologies (e.g., IP and a tactical communication format such as Link 16), QoS component 540 maps QoS markings based on policies defined at gateway 120. These policies may include a direct copy of the existing QoS markings when forwarding from an IP network to another IP network, may include changes to the QoS markings even in an IP-to-IP case, and may include details on how to extend IP QoS markings to a Link 16 network. The same may hold true for any future technology supported by gateway 120. For the IP-to-Link 16 and Link 16-to-IP cases, IP QoS code points may be mapped to Link 16 Network Participation Groups (NPGs) and vice versa, based on pre-defined policies.

DDMP component 545 facilitates sequential and/or parallel processing of incoming messages at gateway 120. In an exemplary embodiment, device management component 510 receives a transmission from a remote device and publishes an incoming message to pub/sub engine 505. An incoming message includes, for example, a source indicator, a destination indicator, one or more message headers, message metadata, QoS markings, a message format, and/or message content. Before any other processing (such as described above) takes place, DDMP component 545 determines, based on the incoming message, a sequence of processing operations that are required for the message content. Necessary processing operations may include, for example, transformation (e.g., translation, decryption, and encryption), persistent storage, and/or load balancing.

DDMP component 545 executes the operations in the order defined by the sequence. In one embodiment, DDMP component 545 defines two or more operations as executable in parallel. For example, DDMP component 545 may determine that message content for a given incoming message must be decrypted, stored, encrypted, and forwarded to another device. DDMP component may define a sequence of operations that includes decryption, then, following decryption, persistence and encryption, and then, following encryption, transmission to the other device. The persistence and encryption operations may be performed in parallel to minimize processing time.

In an exemplary embodiment, to execute the necessary operations, DDMP component 545 publishes requests to other components within gateway 120. For example, to decrypt message content, DDMP component 545 may publish a transformation request to pub/sub engine 505, which will be received by transformation component 520.

In one embodiment, after it processes a message, each functional component 510, 515, 520, 525, 530, 535, 540, 545, and/or 550 within gateway 120 indicates (e.g., to pub/sub engine 505 or to a submitter of a message) that its processing is complete by publishing a response message. DDMP component registers with pub/sub engine 505 a subscription for the various response messages described above. When all subscribing components have indicated such completion, DDMP component creates and publishes to pub/sub engine 505 an outgoing message, to which device management component 510 subscribes. Device management component 510 transmits the outgoing message using an appropriate communication interface 460, 465, 430, 435, or 440, an upper layer socket if this message is directed to gateway 120 itself, and/or any other physical, virtual, or emulated interface.

In an alternative embodiment, DDMP component 545 associates an execution path with a message. The execution path includes a sequence of one or more operations required for processing the message. When a component 510, 515, 520, 525, 530, 535, 540, 545, or 550 completes an operation, the component submits the message to pub/sub engine 505 or directly to the component associated with the subsequent operation in the execution path. The component associated with the subsequent operation receives the message, performs a corresponding operation on the message, and submits the message to the next component. When all operations defined by the execution path have been the performed, the message is transmitted via device management component 510, for example.

In some embodiments, DDMP component 545 includes new header information when creating an outgoing message. The header includes the appropriate source and destination addresses and any other information required by the outgoing communication interface, such as QoS markings. The outgoing message is again published at pub/sub engine 505 and provided via a subscription to device management component 510 for transmission. After translation, the incoming message may be segmented into multiple messages, in which case DDMP component 545 simply generates multiple outgoing messages and publishes the messages to pub/sub engine 505 as before. The messages are received by the device management component 510, which transmits the messages one at a time.

In some embodiments, multiple gateways 120, in a single locale and/or distributed among multiple locales, are communicatively couplable to each other. By connecting to each other, the gateways 120 form an inter-gateway backbone network (IGBN). As a gateway 120 joins the IGBN network, it broadcasts a request for IGBN information. IGBN information includes, for example, a primary gateway identifier, a backup ("shadow") gateway identifier, a collection of identifiers for gateways available within the IGBN, and/or a set of service descriptors for each gateway within the IGBN. If no other gateways 120 respond, the gateway 120 acts as a primary gateway. Gateway 120 responds to subsequent requests for IGBN information by transmitting a IGBN information response, including a primary gateway identifier referencing itself. In addition, the second gateway 120 to join the IGBN may be designated by the primary gateway as a shadow gateway for the IGBN. As other gateways 120 join the IGBN, network topology management component 525 of the primary gateway initiates a request for gateway attributes from the new members of the IGBN. The primary gateway initiates transmissions of gateway attribute data for other network members to the shadow gateway and/or other gateways within the IGBN.

In an exemplary embodiment, the gateways within an IGBN elect a primary gateway and/or a shadow gateway. For example, each gateway may determine a desired primary gateway based on gateway attributes and/or link attributes and transmit (e.g., by broadcasting) a primary gateway election message to the IGBN, including an identifier of the desired primary gateway. The gateway designated by the largest quantity of primary gateway election messages may begin acting as the primary gateway. In addition, the gateway designated by the second largest quantity of primary gateway election messages may begin acting as the shadow gateway. The election process may be initiated periodically (e.g., hourly) or upon a new gateway joining the IGBN, though other timings are contemplated.

In one embodiment, each gateway within the IGBN is programmed to respond to an IGBN information request by transmitting to the sender an IGBN summary message, which includes a primary gateway identifier and a shadow gateway identifier. A newly connected gateway receives the IGBN summary message and transmits an IGBN detail request to the primary gateway based on the primary gateway identifier. The primary gateway is programmed to respond with an IGBN detail message, including a collection of identifiers for gateways available within the IGBN, and/or a set of service descriptors for each gateway within the IGBN. If the newly connected gateway does not receive a response from the primary gateway, the newly connected gateway transmits an IGBN detail request to the shadow gateway based on the shadow gateway identifier. The shadow gateway is also programmed to respond with an IGBN detail message, including a collection of identifiers for gateways available within the IGBN, and/or a set of service descriptors for each gateway within the IGBN.

A component such as one of the functional components described herein may record information to and/or read information from a repository. Such a repository may take the form of in-memory objects, a text file, a data file (e.g., containing serialized objects), or a database, such as a relational, hierarchical, or object oriented database. A repository may reside on a single physical device, such as a data storage device or a memory area, or be distributed among multiple physical devices.

Because gateway 120 employs a middleware data dissemination mechanism (e.g., a publish/subscribe message propagation framework), other components such as application component 550 may be included in gateway 120 to provide additional features. For example, application component 550 may provide device interfaces, platform interfaces, voice services such as voice-to-text conversion and/or voice over IP (VOIP), video transmission, video conferencing, applications, application services, network backbone infrastructure services, security services, and/or management services such as gateway management, tactical node management, and/or network management, though other services are also contemplated.

Components may be installed or updated on the gateway by a user at the gateway or remotely. For example, a new or updated component may be distributed through a global network such as GIG 105 by a remote node such as a GIG node 110. A component may also be distributed to a gateway by a tactical node 125. For example, a tactical node which is designed to communicate using a new communication standard may use an existing, supported communication standard to install on the gateway a component supporting the new standard.

In some embodiments, data is received from a remote node such as a GIG node 110 using a first communication standard and transmitted to a tactical node 125 using a second communication standard. For example, the first communication standard may be IP version 4 (IPv4), IP version 6 (IPv6), or any standard suitable for communicating with devices such as the remote node. The second communication standard may be a version of IP different from the first communication standard, Link-11, Link 16, Link-22, Single Channel Ground-Air Radio System (SINCGARS), Enhanced Position Locating Reporting System (EPLRS), Near Term Digital Radio (NTDR), Have Quick (HQ), Land Mobile Radio (LMR), Multifunction Advanced Data Link (MADL), Situation Awareness Data Link (SADL), or any standard (including IP and non-IP waveforms) suitable for communicating with the tactical node 125.

Figure 7:
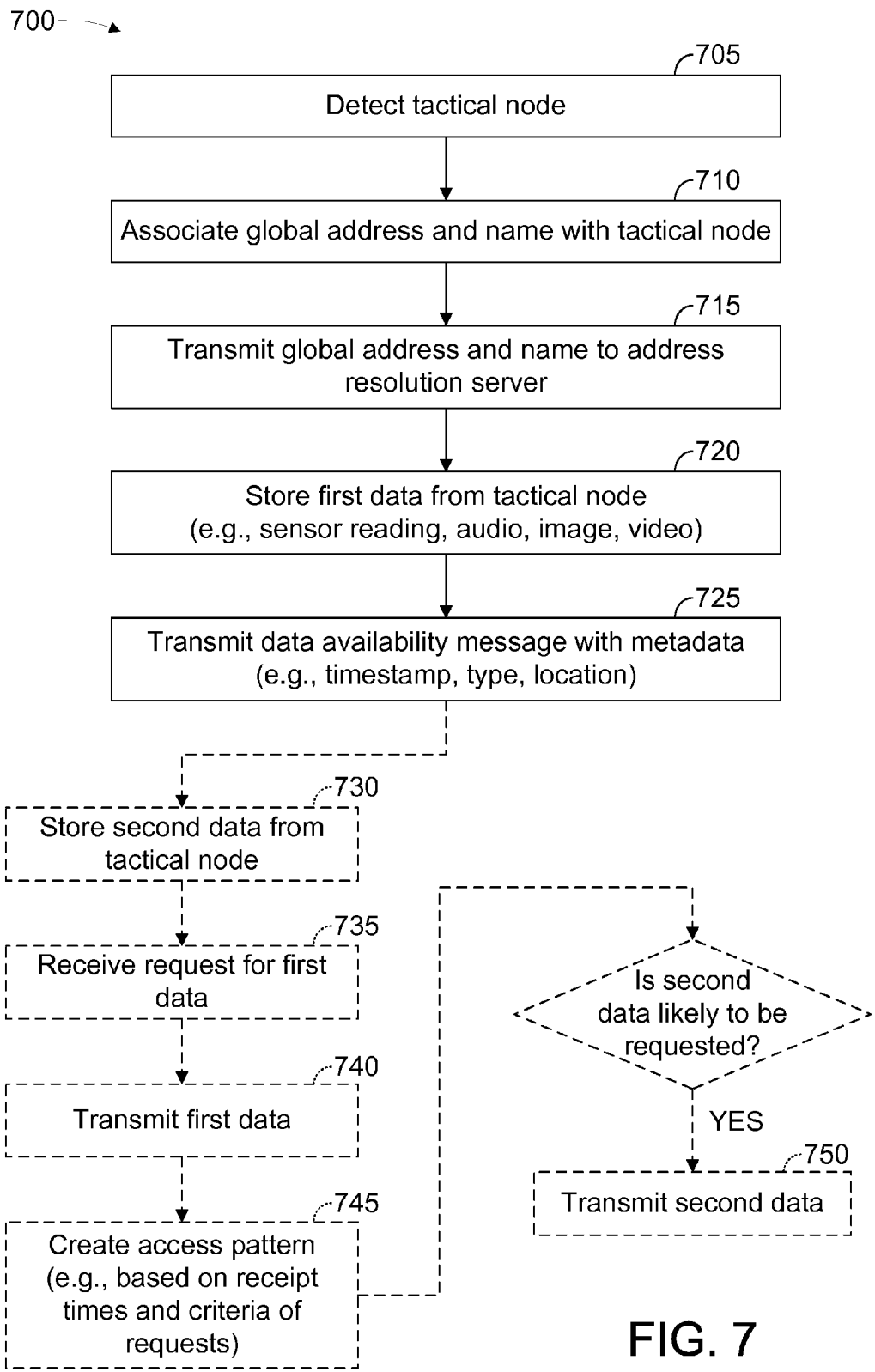
FIG. 7 is a flowchart illustrating an exemplary method for communication in a tactical network using the gateway shown in FIG. 1.

FIG. 7 is a flowchart illustrating an exemplary method for communication in a tactical network using a gateway such as gateway 120. The method includes detecting 705, by a first gateway, a tactical node, associating 710, by the first gateway, a global network address and a name with the tactical node, and transmitting 715 the global network address and the name to an address resolution server via a global network communication interface. First tactical node data received from the tactical node is stored 720 in a memory area. Tactical node data may include, for example, a sensor reading, audio data, an image, and video data. A data availability message, including metadata describing the first tactical node data, is transmitted 725 to a second gateway via a tactical network communication interface. Metadata may include a timestamp indicating when tactical node data was created, a type of tactical node data, and/or a location corresponding to tactical node data. Second tactical node data received from the tactical node may also be stored 730.

In some embodiments, a request for the tactical node data is received 735 from the second gateway, and the first tactical node data is transmitted 740 from the memory area to the second gateway. Furthermore, in some embodiments, access pattern is created 745 based on a plurality of requests for the first tactical node data and a plurality of requests for the second tactical node data. For example, an access pattern may be created 745 by comparing a time of receipt and metadata criteria from each of the plurality of requests for the first tactical node data with a time of receipt and metadata criteria from each of the plurality of requests for the second tactical node data. If the access pattern indicates the second tactical node data is correlated with (e.g., likely to be requested with) the first tactical node data, the second tactical node data is transmitted 750 to the second gateway based on the received request without receiving a request for the second tactical node data from the second gateway.

A gateway such as described herein may act an intermediary or proxy between a local network of tactical nodes 125 and a global network such as GIG 105. Such a gateway may, therefore, enhance security of both the local network and the global network. For example, the gateway may allow into the local network only data directed to a tactical node communicatively attached to the gateway. Conversely, the gateway may block some or all traffic originating in the local network. For data transmitted in either direction, the gateway may maintain and apply a collection of nodes from which data should be refused (a "blacklist") and/or a collection of nodes from which data should be accepted (a "whitelist"). Other security rules are contemplated, as well.

A group of gateways may be deployed to a locale. Deploying a group of gateways increases the capacity for tactical nodes. The gateways may also be programmed to achieve load balancing and redundancy, as described above. For example, each gateway in a group may communicate messages, records, and/or repositories to the other gateways in the group. If a first gateway in a tactical network fails, a second gateway in the tactical network may establish communicative attachment to a tactical node that was attached to the gateway that failed. Because the second gateway received information about the tactical node and/or any communication sessions related to the tactical node before the first gateway failed, the second gateway can resume those communication sessions with little or no interruption in service.

In some embodiments, a gateway is embedded or installed in a mobile unit such as a wheeled vehicle or an aircraft. A group of such gateways may collectively form a mobile ad hoc network (MANET, a/k/a mobile mesh network).

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

Processes, methods, and/or functional components described herein may be implemented, in whole or in part, as computer executable instructions embodied in a computer readable medium. When executed by a processor, the instructions cause the processor to perform the operations described herein. A computer readable medium includes, but is not limited to, a hard disk, an optical disk, a magneto-optical disk, a solid state memory device, and/or any device operable by a computing device to store data and subsequently retrieve the data.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication gateway comprising:
   a communication interface communicatively couplable to a remote gateway; and
   a processor programmed to:
   provide a first instance of a service;
   determine a first gateway attribute for said gateway;
   receive from the remote gateway, via said communication interface, a service availability message describing a second instance of the service provided by the remote gateway;
   receive from the remote gateway, via said communication interface, a gateway attribute message comprising a second gateway attribute of the remote gateway; and
   in response to an execution request for the service, calculate a cost of execution at each of said gateway and the remote gateway to select an execution target from said gateway and the remote gateway based on the first gateway attribute and the second gateway attribute.

2. The gateway of claim 1, wherein said processor determines a first gateway attribute by determining one or more of the following: a processing capacity indicator, a processing usage indicator, a memory capacity indicator, and a memory usage indicator.

3. The gateway of claim 2, wherein said processor receives a second gateway attribute by receiving one or more of the following: a processing capacity indicator, a processing usage indicator, a memory capacity indicator, and a memory usage indicator.

4. The gateway of claim 1, wherein said processor is further programmed to initiate a service execution at the selected execution target based on the execution request.

5. The gateway of claim 1, wherein said processor calculates the cost by calculating one or more of the following: an estimated duration of execution and an incremental resource usage indicator.

* * * * *